Dec. 3, 1929.          A. F. MOWRY                1,738,111
                     FABRIC CLAMPING CLIP
                       Filed Feb. 9, 1928
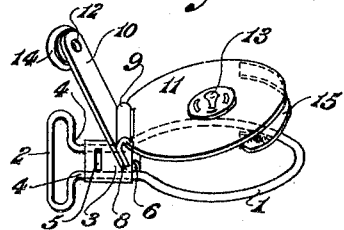
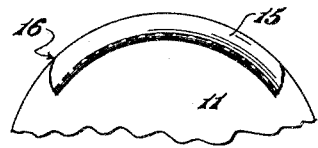
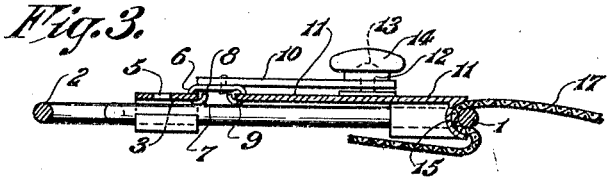
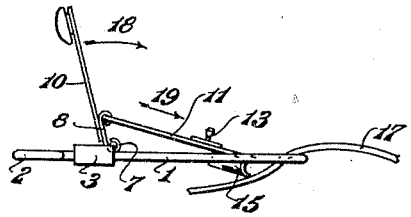
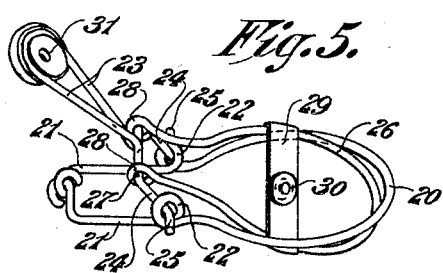
INVENTOR,
Adelbert F. Mowry,
BY Harry W. Bowen.
ATTORNEY.

Patented Dec. 3, 1929

1,738,111

UNITED STATES PATENT OFFICE

ADELBERT F. MOWRY, OF WORCESTER, MASSACHUSETTS

FABRIC-CLAMPING CLIP

Application filed February 9, 1928. Serial No. 253,054.

This invention relates to improvements in fabric clamping clips. The object of the invention is to provide a clamping device, or clip which is designed for clamping very thin or sheer fabrics, as silk hose, without the possibility of tearing or otherwise injuring the fabric.

Broadly, the invention comprises two circular shaped members that are pivotally connected together for operating one relative to the other. One of the members is considered the stationary member and the other movable. The movable member is connected to the stationary member by means of a hinge joint, whereby when the securing means which retains them in clamping relation, is operated, the movable member is moved radially toward the fixed member with the result that the fabric is only clamped by direct pressure. The movable member is provided with a grooved depending portion to receive the fabric and wire of the fixed member. As a modification instead of the plate member being used a circular wire is employed for the movable clamping part. The fixed wire member and the pivotal connection between the two members is in effect a toggle joint. The usual snap or other fastner device is employed to retain the members in their clamping position.

Referring to the drawings:

Fig. 1 is a perspective view of the clasp showing the movable part spaced from the fixed member.

Fig. 2 is a detail view of a portion of the movable clamping part showing the depending grooved part which receives the fixed wire and the fabric to be clamped.

Fig. 3 is a vertical sectional view considered on a plane through the diameter of the movable part and fixed wire.

Fig. 4 illustrates the movable positions of the parts when in the operation of clamping the fabric and Fig. 5 is a perspective view of a modification showing the parts open, all of the parts being made of wire.

Referring to the drawings in detail:

1 may be considered the fixed circular shaped loop of wire which is formed with the part 2 for attachment to a variable suspension member. 3 is a U-shaped metal part which connects the portions 4 of the wire 1. This part is preferably secured to the portions 4 by clinching. It is formed with the two openings 5 and 6. In the opening 6 is placed the loop 7 of the link 8. The link 8 is formed with a secondary loop 9 to which the operating lever 10 is secured as by riveting. Pivotally connected to the loop 9 is the movable clamping member 11. The lever 10 carries one part of the fastening indicated at 12, the other part of the fastener being indicated at 13, which is located on the upper surface of the member 11. Secured to the lever 10 is the thumb piece 14 for operating the same when the fasteners are to be connected or secured together. Formed at the forward lower edge of the part 11 is a grooved section 15. It is made concave or U-shaped in cross section as clearly shown in Figs. 1, 3, and 4. The end of the piece 15 is formed with a curve 16 to prevent tearing or cutting the fabric 17 to be clamped.

The operation of the clamping device, shown in Fig. 1, may be described as follows: Consider the parts in the position as shown in Fig. 4. The fabric 17 to be clamped is inserted between the circular fixed member 1 and the movable member 11. The lever, 10 is now moved in the direction of the arrow 18 which causes the member 11 to travel downward in the direction indicated by the arrow 19. The depending and grooved arc-shaped section 15 will engage the fabric as shown in Fig. 3 and clamp or pinch the same between the part 1 and the part 15. The fastener parts 12 and 13 operate to hold the parts in their clamping position. In order to disengage the fabric 17 it is only necessary to lift upward on the thumb piece 14 and move the lever 10 into the position shown in Fig. 4.

Referring to Fig. 5, which shows a modification, 20 designates a fixed wire member, having the arm portions 21 and loops or pivot eyes 22. 23 is the operating lever having the integral crank or arm portions 24 and terminal pivot ends 25 which are located in the two eyes 22. 26 is the movable clamping wire member which cooperates with the fixed wire 20. The wire 26 is pivotally connected to the upper ends of the crank arms 24 at 27 by means of the loops 28. Spanning the loop wire 26 is the plate 29 carrying one part 30 of the fastener. The other part of the fastener 31 is secured to the lever 23. In this construction the operation of clamping the fabric is the same as in Fig. 4 since the loop 26 is pivotally connected to the lever 23 at points 27 of the crank arms 24 which are distant from the pivotal ends 23 of the fixed wire 20. The depending arc-shaped portion 15 is not employed but the fabric will be given or have imparted thereto a sharp bend which will sufficiently grip the thin fabric to retain it in place and prevent its slipping out. The large clamping arcs of the two wires 20 and 26 will engage the fabric to prevent tearing or injuring the same.

It is to be understood that I do not limit myself to the use of arc-shaped clamping members, as rectangular or other desired shapes may of course be employed, without departing from the principle of my invention. The part 15 may be any other suitable shape desired for the purpose intended.

What I claim is:

1. A fabric clamping device comprising in combination with a substantially circular stationary member, a movable member composed of wire pivotally connected to the stationary member, a curved concavo-convex shaped part on the under side of the movable member for receiving the circular stationary wire member when the movable member is operated, lever means attached to the pivotal connecting means of the movable member for moving the movable member downwards and radially towards the stationary member, the construction and arrangement being such that the movable member has imparted thereto a radial motion as the lever means is moved into its closing position towards the movable member, and means on the movable member for retaining the lever means and the movable member locked together.

2. A fabric clamping device comprising a circular shaped fixed member, an operating lever pivotally connected at one end to the fixed member at a point opposite the fabric clamping position of the fixed member, a movable clamping member pivotally connected to the operating lever at a point distant from its pivotal end connection with the fixed member for imparting a radial movement to the movable clamping member as the operating lever is moved forward and downward toward the fixed member, and cooperating securing means on the outer end of the operating lever and the upper surface of the movable clamping member, the clamping member having an arc-shaped section on its under side for receiving the fixed member whereby fabric is clamped between the fixed and movable members.

3. A fabric clamping device comprising a circular shaped fixed member, an operating lever pivotally connected at one end to the fixed member at a point opposite the fabric clamping position of the fixed member, a movable clamping member pivotally connected to the operating lever at a point distant from its pivotal end connection with the fixed member for imparting a radial movement to the movable clamping member as the operating lever is moved forward and downward toward the fixed member, and cooperating securing means on the outer end of the operating lever and the upper surface of the movable clamping member, the movable clamping member having an arc-shaped section on its under side for receiving the fixed member, whereby a fabric is clamped between the fixed and movable members, the fixed and movable members being in substantially parallel planes when in their fabric clamping positions.

4. A fabric clamping device comprising in combination a substantially stationary member, a movable member pivotally connected to the stationary member, a curved grooved section on the under side of the movable member for receiving the stationary member when the movable member is operated, lever means attached to the pivotal connecting means of the movable member for moving the movable member towards the stationary member, the construction and arrangement being such that the movable member has imparted thereto a radial motion as the lever means is moved into its closing position toward the movable member, and means for retaining the lever means and the movable member locked together, as the lever means is moved in the same direction as the movable member, as described.

ADELBERT F. MOWRY.